US012783030B1

(12) United States Patent
Hegde et al.

(10) Patent No.: US 12,783,030 B1
(45) Date of Patent: Nov. 3, 2026

(54) ENABLING A POWER-CYCLE OPERATION OF A POWER SUPPLY MODULE AFTER A DELAY PERIOD HAS ELAPSED

(71) Applicant: Juniper Networks, Inc., Sunnyvale, CA (US)

(72) Inventors: Vinay Manjunath Hegde, Bangalore (IN); Sampath Kumar Gembali, Bangalore (IN); Vinod Babu, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 79 days.

(21) Appl. No.: 18/781,477

(22) Filed: Jul. 23, 2024

(51) Int. Cl.
*G06F 1/00* (2006.01)
*G06F 1/26* (2006.01)
*G06F 1/3203* (2019.01)

(52) U.S. Cl.
CPC .............. *G06F 1/26* (2013.01); *G06F 1/3203* (2013.01)

(58) Field of Classification Search
CPC .......................................................... G06F 1/26
USPC .......................................................... 713/300
See application file for complete search history.

(56) References Cited

U.S. PATENT DOCUMENTS 5,224,010 A * 6/1993 Tran .......................... G06F 1/28 361/90
5,835,780 A * 11/1998 Osaki ...................... G06F 1/263 714/14
6,735,704 B1 * 5/2004 Butka ....................... H02J 3/38 713/340
7,398,406 B2 * 7/2008 Naruse ...................... G06F 1/24 713/320
11,228,201 B2 1/2022 Zhang et al.
11,397,455 B2 7/2022 Fong et al.
2002/0104031 A1 * 8/2002 Tomlinson ................ G06F 1/24 713/320
2004/0128368 A1 * 7/2004 Sakai .................. H04L 41/0213 709/220
2006/0242438 A1 * 10/2006 Baba ....................... G06F 1/263 713/300
2007/0035280 A1 * 2/2007 Fujiyama ............. H03K 17/122 323/212
2007/0214372 A1 * 9/2007 Doyon .................. H04M 19/08 713/300
2009/0158071 A1 * 6/2009 Ooi ......................... G06F 11/30 713/340
2009/0307510 A1 * 12/2009 Atsumi ................. G06F 1/3203 713/322

(Continued)

*Primary Examiner* — Volvick Derose
(74) *Attorney, Agent, or Firm* — Harrity & Harrity, LLP

(57) ABSTRACT

A network device includes one or more power supply modules (PSMs) and one or more processors. The one or more processors are to send, to a PSM of the one or more PSMs, a power-cycle command message. The power-cycle command message indicates that the PSM is to commence a power-cycle operation after a delay period has elapsed, and, accordingly, sending the power-cycle command message enables the PSM to commence the power-cycle operation after the delay period has elapsed. The one or more processors are to cause, based on sending the power-cycle command message, a power-down operation associated with the one or more processors to commence. The power-down operation is to complete prior to the delay period elapsing.

20 Claims, 8 Drawing Sheets

(56) References Cited

U.S. PATENT DOCUMENTS

| | | | | |
|---|---|---|---|---|
| 2011/0225434 | A1* | 9/2011 | Nishikawa | G06F 1/24 713/300 |
| 2012/0260109 | A1* | 10/2012 | Zhai | G06F 1/3203 713/300 |
| 2013/0060982 | A1* | 3/2013 | Yamagami | G06F 9/505 710/107 |
| 2013/0201516 | A1* | 8/2013 | Ito | H04N 1/00891 358/1.14 |
| 2013/0293013 | A1* | 11/2013 | Templeton | G06F 1/266 307/64 |
| 2014/0028360 | A1* | 1/2014 | Lee | H03L 7/00 327/143 |
| 2015/0070056 | A1* | 3/2015 | Tanadi | G05F 1/66 327/143 |
| 2015/0155854 | A1* | 6/2015 | Hayasaka | G06F 1/30 327/143 |
| 2015/0169040 | A1* | 6/2015 | Kawano | G06F 1/30 713/330 |
| 2016/0266623 | A1* | 9/2016 | Ito | G06F 1/24 |
| 2018/0024965 | A1* | 1/2018 | Suzuki | G06F 1/3206 709/213 |
| 2019/0302870 | A1* | 10/2019 | Tsukio | G06F 1/24 |
| 2019/0356801 | A1* | 11/2019 | Okuma | H04N 1/00477 |
| 2020/0081510 | A1* | 3/2020 | Fong | H02J 9/005 |
| 2020/0117468 | A1* | 4/2020 | Flynn | G06F 9/442 |
| 2020/0336001 | A1* | 10/2020 | Zhang | H02J 9/005 |
| 2022/0027474 | A1* | 1/2022 | Street | G06F 9/542 |
| 2022/0035430 | A1* | 2/2022 | Choudhury | G06F 1/30 |
| 2022/0294923 | A1* | 9/2022 | Sasaki | H04N 1/00891 |
| 2022/0334846 | A1* | 10/2022 | Doi | G06F 1/24 |
| 2022/0404893 | A1* | 12/2022 | Hikichi | G06F 1/3215 |
| 2025/0008041 | A1* | 1/2025 | Hikichi | G06F 1/3284 |
| 2025/0359956 | A1* | 11/2025 | Friedrich | A61B 34/37 |

* cited by examiner

ENABLING A POWER-CYCLE OPERATION OF A POWER SUPPLY MODULE AFTER A DELAY PERIOD HAS ELAPSED

BACKGROUND

A network device (e.g., a switch, a router, or another type of network device) may include one or more power supply modules (PSMs). Each PSM provides power (e.g., electrical power) to the network device to enable operation of the network device.

SUMMARY

In some implementations, a network device includes one or more PSMs; and one or more processors to: send, to a PSM of the one or more PSMs, a power-cycle command message; and cause, based on sending the power-cycle command message, a power-down operation associated with the one or more processors to commence.

In some implementations, a non-transitory computer-readable medium storing a set of instructions includes one or more instructions that, when executed by one or more processors of a network device, cause the network device to: send, to a PSM of the network device, a power-cycle command message; and cause a power-down operation associated with the one or more processors to commence.

In some implementations, a network device includes one or more processors; and one or more PSMs, wherein each PSM is to: receive, from the one or more processors, a power-cycle command message; and cause, based on the power-cycle command message, a power-cycle operation to commence after a delay period has elapsed.

DETAILED DESCRIPTION

Figure 1A:
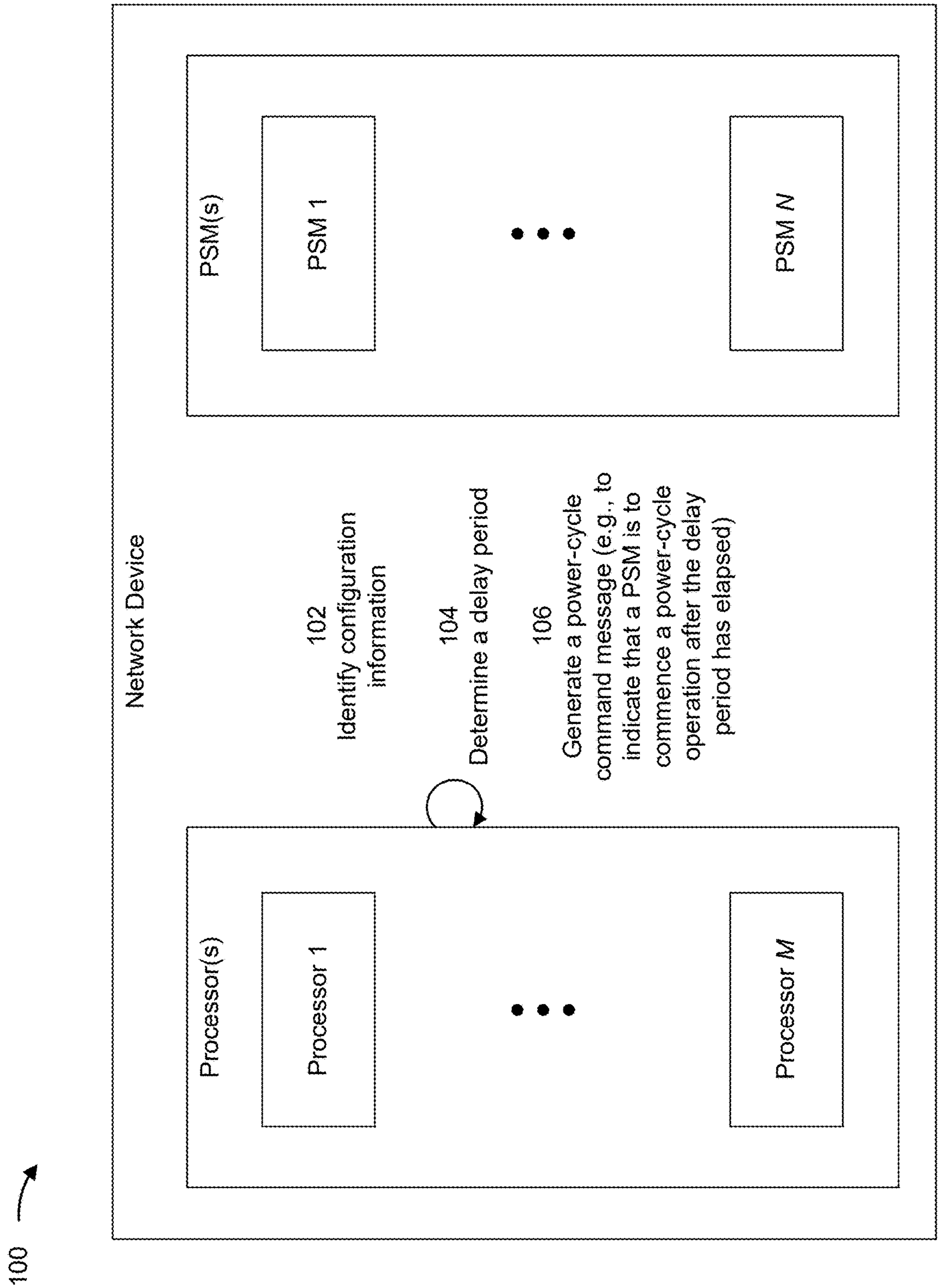
FIGS. 1A-1C are diagrams of an example implementation associated with enabling a power-cycle operation of a PSM after a delay period has elapsed.

The following detailed description of example implementations refers to the accompanying drawings. The same reference numbers in different drawings may identify the same or similar elements.

A network device can include one or more PSMs, as well as one or more processors (and one or more other components, such as one or more memories). In many cases, the one or more processors (and/or the one or more other components) of the network device need to be powered-down (e.g., to allow for an update of the one or more processors, such as in association with a firmware upgrade of the network device). This can be accomplished by physically shutting off power to the network device (e.g., by manually unplugging the one or more PSMs from a power source), but this abrupt change in power (e.g., while the one or more processors are operating) can damage the one or more processors and/or other sensitive components of the network device. This results in an impaired performance of the network device and a decreased operable life of the network device.

Some implementations described herein include a network device that includes one or more PSMs and one or more processors (and/or one or more other components). The one or more processors may send, to a PSM of the one or more PSMs, a power-cycle command message. The power-cycle command message indicates that the PSM is to commence a power-cycle operation (e.g., that includes execution of a power-off operation of the PSM followed by execution of a power-on operation of the PSM) after a delay period has elapsed, and, accordingly, sending the power-cycle command message enables the PSM to commence the power-cycle operation after the delay period has elapsed.

The one or more processors cause, based on sending the power-cycle command message, a power-down operation associated with the one or more processors to commence, which enables the one or more processors (and/or the one or more other components of the network device) to be powered-down in a sequence. That is, causing the power-down operation to commence enables a "graceful" powering-down of the one or more processors (and/or the one or more other components of the network device). Further, the power-down operation is able to complete prior to the delay period elapsing. In this way, some implementations described herein allow the one or more processors (and/or the one or more other components of the network device) to be powered-down prior to the power-cycle operation, which thereby reduces a likelihood of damage to the one or more processors (and/or the one or more other components of the network device), as compared to a likelihood of damage that would otherwise result from an abrupt change in power while the one or more processors are powered-up. This therefore improves a performance of the network device and increases an operable life of the network device.

Additionally, some implementations include sending of a single power-cycle command message, which enables execution of a power-off operation of the PSM followed by (e.g., without delay, or with only a small delay on the order of milliseconds or seconds) execution of a power-on operation of the PSM. This type of functionality is not currently available for PSMs of a network device. Accordingly, some implementations described herein enable a power-cycle functionality for PSMs of a network device that is not otherwise practically available.

Figure 1B:
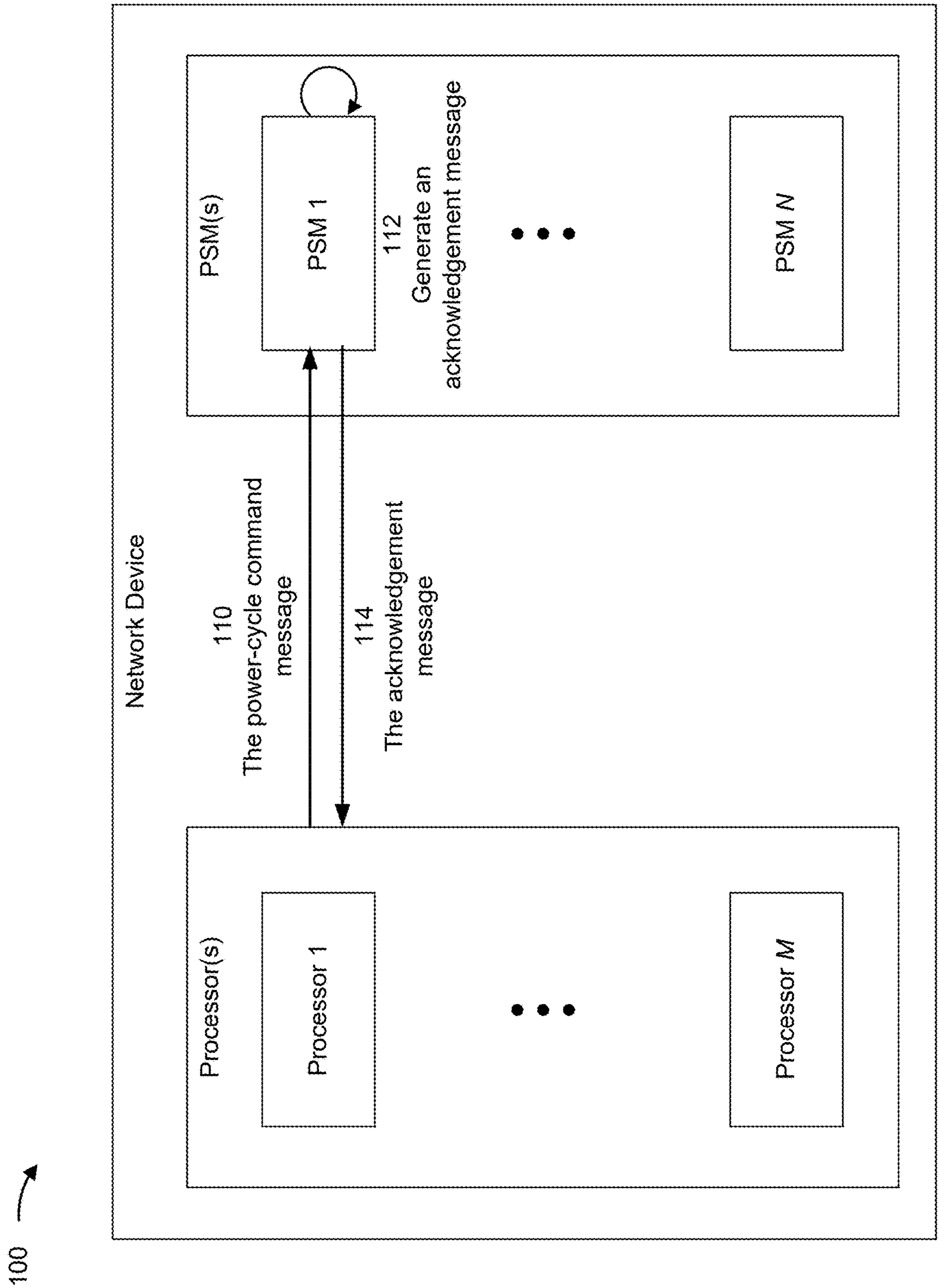
Figure 1C:
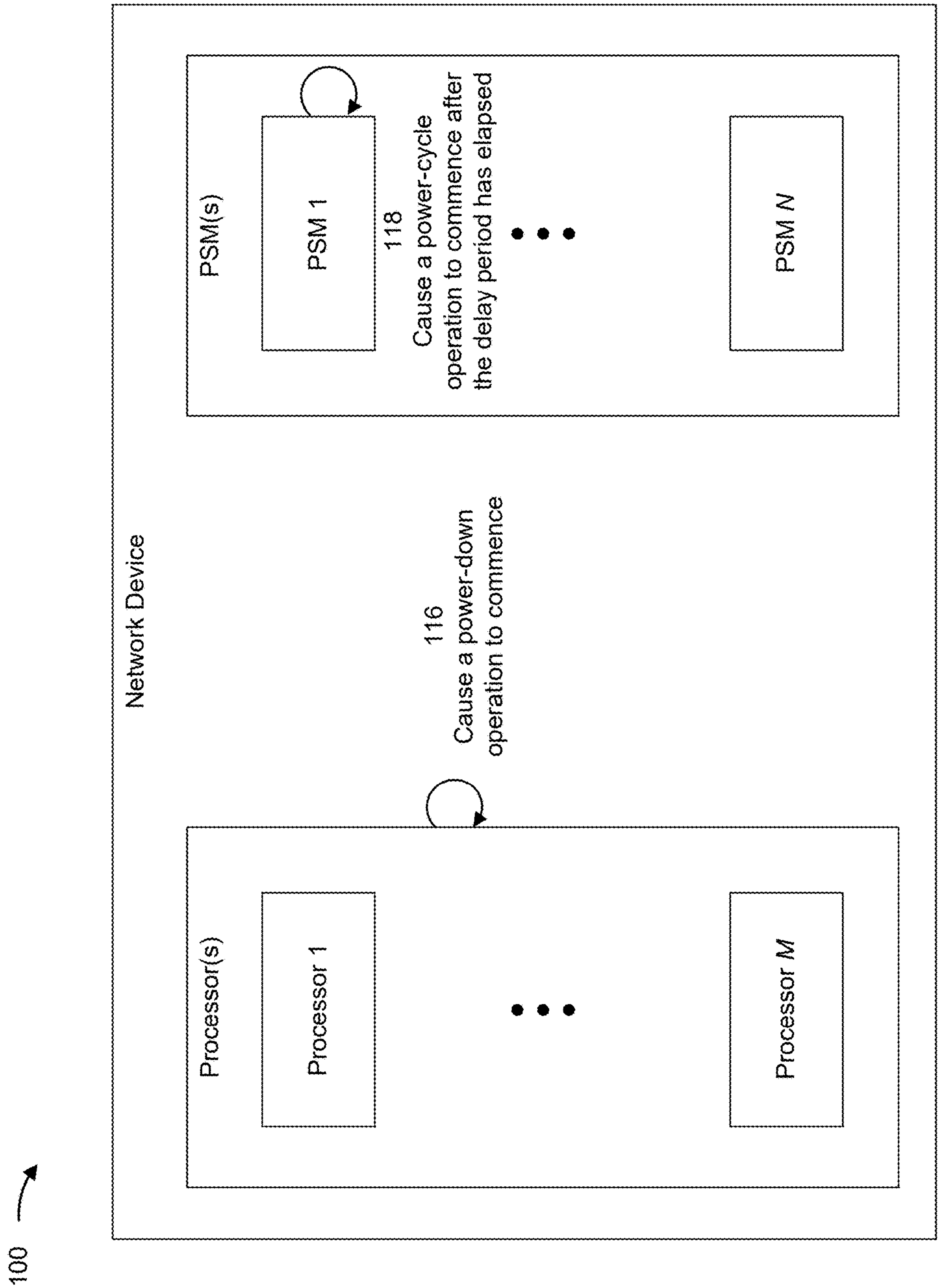

FIGS. 1A-1C are diagrams of an example implementation 100 associated with enabling a power-cycle operation of a PSM after a delay period has elapsed. As shown in FIGS. 1A-1C, example implementation 100 includes a network device, which includes one or more processors (shown as processors 1 to M, where M≥1) and one or more PSMs (shown as PSMs 1 to N, where N≥1). The network device may include one or more other components, such as one or more memories (not shown). The network device is described in more detail below in connection with FIGS. 2-4.

As shown in FIG. 1A, and by reference number 102, the one or more processors may identify configuration information. The one or more processors may be pre-configured with the configuration information (e.g., may be loaded with the configuration information upon initialization or start-up of the network device) or may obtain the configuration information by communicating with a data source (e.g., before and/or in association with performing one or more other operations described herein).

The configuration information may indicate, for example, information identifying the one or more processors, information identifying respective types of the one or more processors, information identifying one or more characteristic parameters of the one or more processors (e.g., information identifying an amount of time needed to complete a power-down operation associated with the one or more processors), information identifying one or more operation characteristics of the one or more processors (e.g., information identifying one or more operations that need to be performed as part of a power-down operation associated with the one or more processors), and/or similar information associated with the one or more processors. Additionally, or alternatively, the configuration information may indicate, for example, information identifying the one or more PSMs, information identifying respective types of the one or more PSMs, information identifying one or more characteristics of the one or more PSMS, information identifying one or more operation characteristics of the one or more PSMs, and/or similar information associated with the one or more PSMs. The configuration information may also indicate, for example, information identifying the one or more other components of the network device (e.g., one or more other hardware components, such as one or more memories), information identifying respective types of the one or more other components, information identifying one or more characteristics of the one or more other components, one or more operation characteristics of the one or more other components, and/or similar information associated with the one or more other components.

As shown by reference number 104, the one or more processors may determine a delay period. The delay period may be, for example, a period of time that is to elapse prior to at least one of the PSMs, of the one or more PSMs, commencing a power-cycle operation, as further described herein. Additionally, or alternatively, the delay period may be a period of time that is needed for a power-down operation associated with the one or more processors (and, optionally, the one or more other components) to complete, as further described herein. Accordingly, the delay period may be greater than an amount of time to complete the power-down operation. In some implementations, the delay period may indicate an amount of time (e.g., on the order of milliseconds, seconds, tens of seconds, or minutes) from an instant of time associated with determining the delay period, may indicate a time in the future (e.g., with accuracy on the order of milliseconds, seconds, tens of seconds, or minutes), or may indicate another measurement of time.

The one or more processors may determine the delay period based on the configuration information (e.g., by processing the configuration information). For example, the configuration information may indicate the delay period and the one or more processors may process (e.g., parse and/or read) the configuration information to determine the delay period. As an alternative example, the one or more processors may process (e.g., using one or more processing and/or analysis techniques) the configuration information to determine the delay period. That is, the one or more processors may process the configuration information to determine a period of time that is to elapse prior to at least one of the PSMs, of the one or more PSMs, commencing a power-cycle operation, wherein a power-down operation associated with the one or more processors (and, optionally, the one or more other components) can complete prior to an end of the period of time.

As shown by reference number 106, the one or more processors may generate a power-cycle command message. The power-cycle command message may indicate that a PSM (e.g., that is to receive the power-cycle command message, as further described herein), of the one or more PSMs, is to commence a power-cycle operation, such as after the delay period has elapsed. For example, the power-cycle command message may include a first portion that indicates the delay period, and a second portion that indicates that the PSM is to commence the power-cycle operation (e.g., after the delay period has elapsed).

As shown in FIG. 1B, and by reference number 110, the one or more processors may send the power-cycle command message to a PSM (shown as PSM 1) of the one or more PSMs. The one or more processors may send the power-cycle command message to the PSM via a bus (e.g., a message bus) between the one or more processors and the PSM. Accordingly, the PSM may receive the power-cycle command message from the one or more processors (e.g., via the bus).

As shown by reference number 112, the PSM may generate an acknowledgement message. The acknowledgement message may indicate that the PSM received the power-cycle command and/or that the PSM is to commence a power-cycle operation (e.g., after the delay period has elapsed). In some implementations, the PSM may generate the acknowledgement message based on the power-cycle command message. For example, the PSM may process (e.g., parse and/or read) the power-cycle command message (e.g., to identify the information included in the message), and may thereby generate the acknowledgement message as a response to the power-cycle command message and/or to indicate that the PSM received the power-cycle command and/or that the PSM is to commence a power-cycle operation (e.g., after the delay period has elapsed).

As shown by reference number 114, the PSM may send the acknowledgement message to the one or more processors. The PSM may send the acknowledgment message to the one or more processors via the bus between the one or more processors and the PSM. Accordingly, the one or more processors may receive the acknowledgement message from the PSM (e.g., via the bus).

While FIG. 1B shows the one or more processors sending a single power-cycle command message to a single PSM, the one or more processors may send a same (or a similar) power-cycle command message to each PSM of the one or more PSMs. Thus, each PSM may operate in a same, or similar, manner as the PSM (e.g., the PSM 1) described herein in relation to FIG. 1B. In this way, each PSM may generate and send an acknowledgement message to the one or more processors, and therefore the one or more processors may receive an acknowledgement message from each PSM.

As shown in FIG. 1C, and by reference number 116, the one or more processors may cause a power-down operation (e.g., associated with the one or more processors and/or the one or more other components of the network device) to commence. The one or more processors may cause the power-down operation to commence based on receiving the acknowledgement message from the PSM, as described herein in relation to FIG. 1B (or based on receiving an acknowledgement message from each PSM of the one or more PSMs). In this way, the PSM (or each PSM of the one or more PSMs) may cause, or may enable, the power-down operation to commence (e.g., may cause, or may enable, the one or more processors to commence the power-down operation).

The power-down operation may include powering down at least one of the one or more processors (and/or the one or more other components of the network device). In some implementations, causing the power-down operation to commence enables the one or more processors (and/or the one or more other components of the network device) to be powered-down in a sequence (e.g., where each individual processor, or individual component, is powered-down in a particular order, or where groups of processors, or groups of components, are powered-down in a particular order). That is, causing the power-down operation to commence enables a "graceful" powering-down of the one or more processors (and/or the one or more other components of the network device).

As shown by reference number 118, each PSM of the one or more PSMs (e.g., that received a power-cycle command message, such as described herein in relation to FIG. 1B) causes a power-cycle operation to commence. The PSM may cause the power-cycle operation to commence based on receiving the power-cycle command message from the one or more processors. In this way, the one or more processors may cause, or may enable, the power-cycle operation to commence (e.g., may cause, or may enable, the PSM to commence the power-cycle operation).

A power-cycle operation may include, for example, execution of a power-off operation of the PSM followed by (e.g., without delay, or with only a small delay on the order of milliseconds or seconds) execution of a power-on operation of the PSM. In some implementations, the power-cycle operation is then completed such that first values of one or more power characteristics associated with the PSM, such as an amperage, a voltage, or another operating power characteristic, prior to execution of the power-off operation (e.g., during execution of the power-cycle operation) are the same as, or similar to, second values of the one or more power characteristics after execution of the power-on operation (e.g., during execution of the power-cycle operation).

As further shown by reference number 118, the PSM may cause the power-cycle operation to commence after the delay period (e.g., that is indicated by the power-cycle command message) has elapsed. In this way, the PSM may prevent the power-cycle operation from commencing prior to completion of the power-down operation (e.g., that is commenced by the one or more processors, as described herein in relation to reference number 116). Thus, the power-cycle operation may be referred to as a "delayed" power-cycle operation or a "graceful" power-cycle operation.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
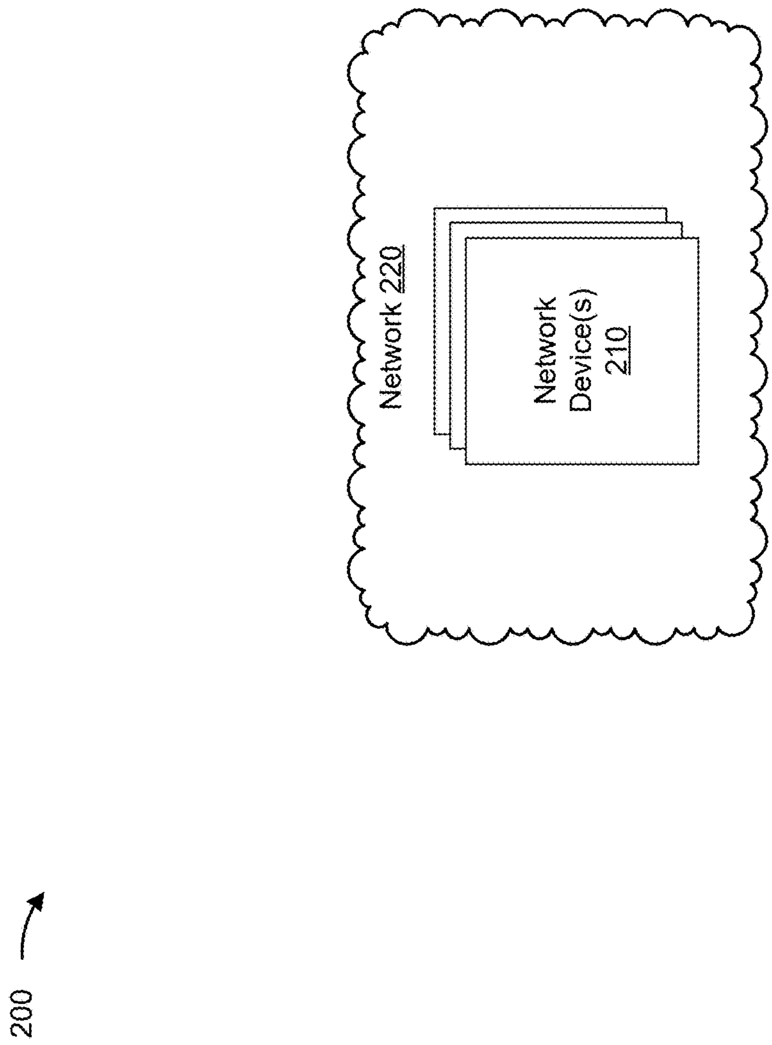
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more network devices 210 and a network 220. Devices of environment 200 may interconnect via wired connections, wireless connections, or a combination of wired and wireless connections.

Network device 210 includes one or more devices capable of receiving, processing, storing, routing, and/or providing information, such as in a manner described herein. For example, network device 210 may include a router, such as a label switching router (LSR), a label edge router (LER), an ingress router, an egress router, a provider router (e.g., a provider edge router or a provider core router), a virtual router, or another type of router. Additionally, or alternatively, network device 210 may include a gateway, a switch, a firewall, a hub, a bridge, a reverse proxy, a server (e.g., a proxy server, a cloud server, or a data center server), a load balancer, and/or a similar device. In some implementations, network device 210 may be a physical device implemented within a housing, such as a chassis. Network device 210 may include one or more processors, one or more PSMs, and/or one or more other components (e.g., one or more memories).

Network 220 includes one or more wired and/or wireless networks. For example, network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
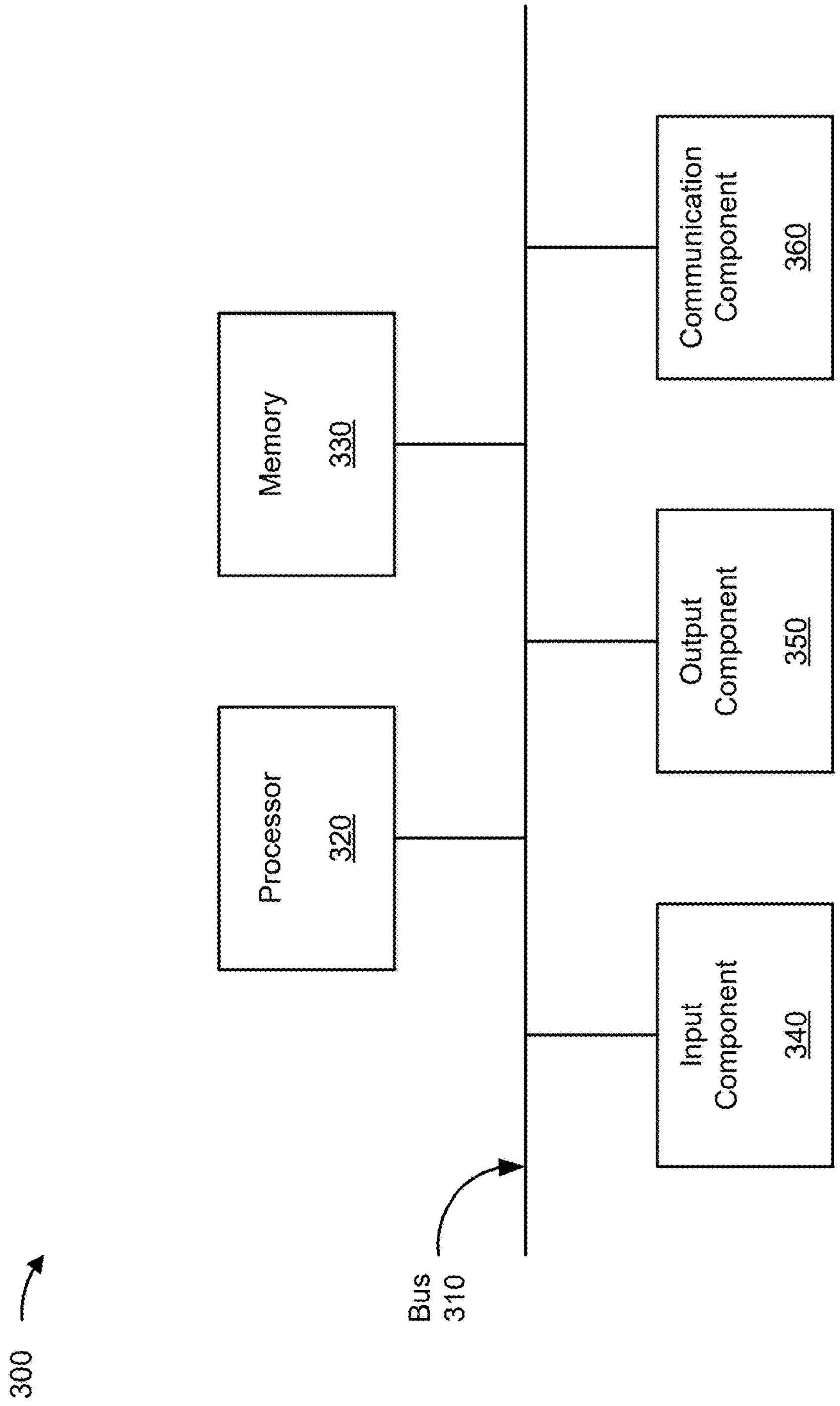
FIG. 3 is a diagram of example components of a device associated with enabling a power-cycle operation of a PSM after a delay period has elapsed.

FIG. 3 is a diagram of example components of a device 300 associated with enabling a power-cycle operation of a PSM after a delay period has elapsed. The device 300 may correspond to network device 210. In some implementations, network device 210 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
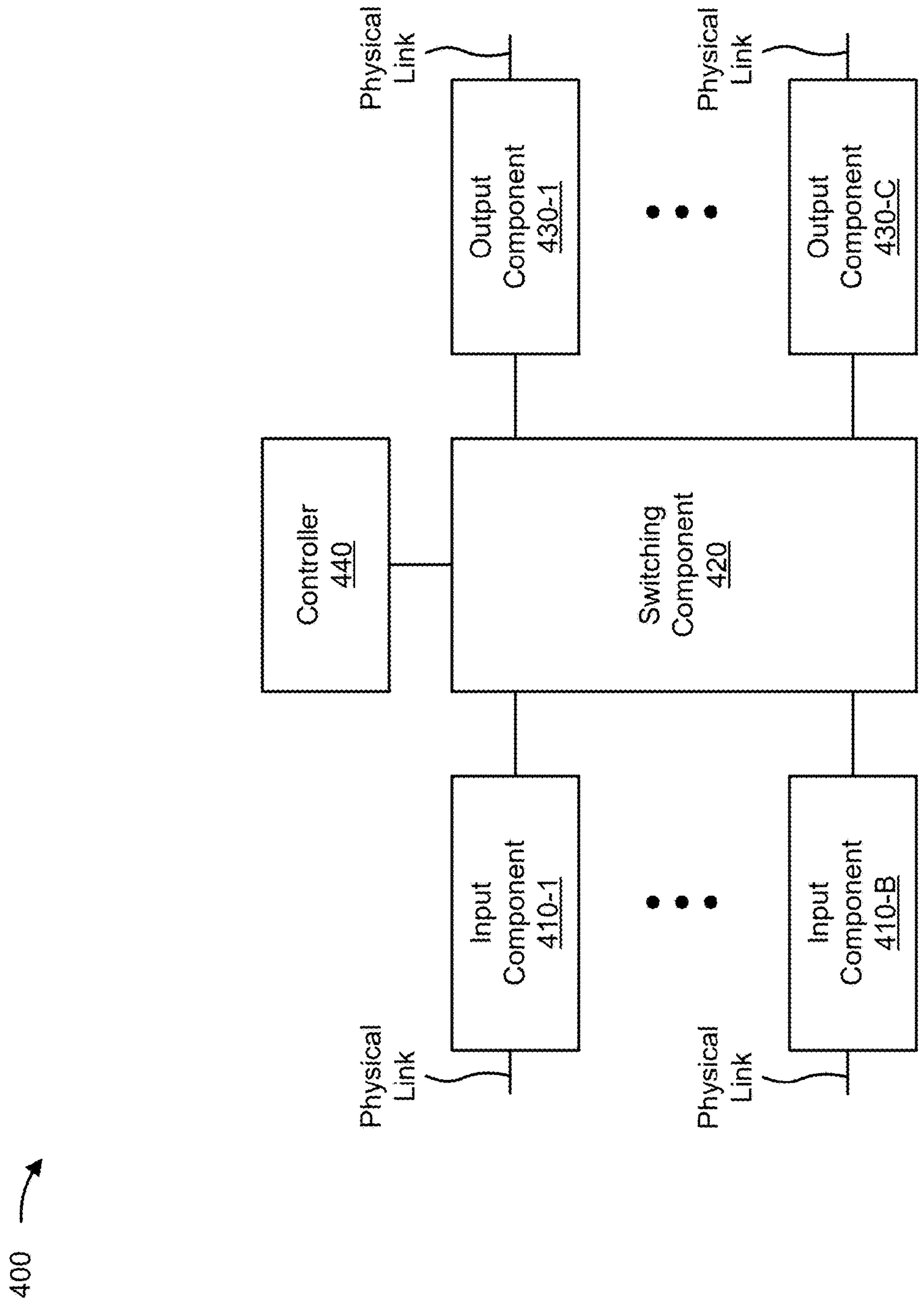
FIG. 4 is a diagram of example components of a device associated with enabling a power-cycle operation of a PSM after a delay period has elapsed.

FIG. 4 is a diagram of example components of a device 400 associated with enabling a power-cycle operation of a PSM after a delay period has elapsed. Device 400 may correspond to network device 210. In some implementations, network device 210 may include one or more devices 400 and/or one or more components of device 400. As shown in FIG. 4, device 400 may include one or more input components 410-1 through 410-B ($B \geq 1$) (hereinafter referred to collectively as input components 410, and individually as input component 410), a switching component 420, one or more output components 430-1 through 430-C ($C \geq 1$) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), a field-programmable gate array (FPGA), an application-specific integrated circuit (ASIC), and/or another type of processing component. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
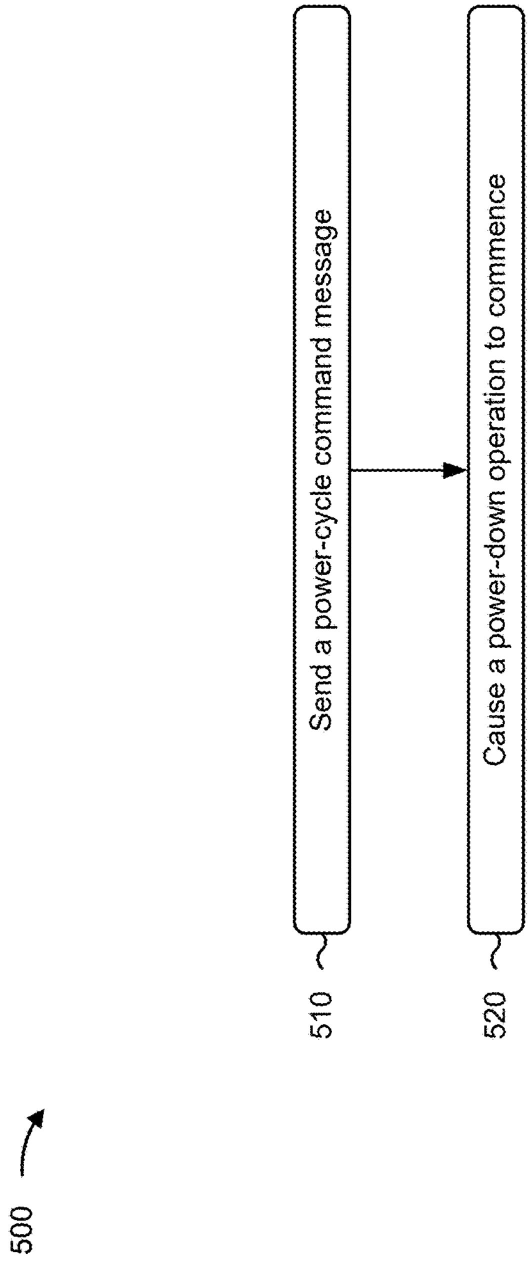
FIG. 5 is a flowchart of an example process associated with enabling a power-cycle operation of a PSM after a delay period has elapsed.

FIG. 5 is a flowchart of an example process 500 associated with enabling a power-cycle operation of a PSM after a delay period has elapsed. In some implementations, one or more process blocks of FIG. 5 are performed by one or more processors of a network device (e.g., network device 210). In some implementations, one or more process blocks of FIG. 5 are performed by another device or a group of devices separate from or including the one or more processors, such as one or more PSMs of the network device. Additionally, or alternatively, one or more process blocks of FIG. 5 may be performed by one or more components of device 300, such as processor 320, memory 330, input component 340, output component 350, and/or communication component 360; device 400, such as input component 410, switching component 420, output component 430, and/or controller 440; and/or another device.

As shown in FIG. 5, process 500 may include sending a power-cycle command message (block 510). For example, the one or more processors may send, to a PSM of the one or more PSMs, a power-cycle command message, as described above.

As further shown in FIG. 5, process 500 may include causing a power-down operation to commence (block 520). For example, the one or more processors may cause, based on sending the power-cycle command message, a power-down operation associated with the one or more processors to commence, as described above.

Process 500 may include additional implementations, such as any single implementation or any combination of implementations described below and/or in connection with one or more other processes described elsewhere herein.

In a first implementation, the power-cycle command message indicates that the PSM is to commence a power-cycle operation after a delay period has elapsed.

In a second implementation, alone or in combination with the first implementation, process 500 includes determining, prior to sending the power-cycle command message, the delay period based on configuration information associated with the one or more processors.

In a third implementation, alone or in combination with one or more of the first and second implementations, sending the power-cycle command message enables the PSM to commence a power-cycle operation after a delay period has elapsed.

In a fourth implementation, alone or in combination with one or more of the first through third implementations, process 500 includes receiving, after sending the power-cycle command message and before causing the power-down operation, an acknowledgement message from the PSM.

In a fifth implementation, alone or in combination with one or more of the first through fourth implementations, the acknowledgement message indicates at least one of: the PSM received the power-cycle command message, or the PSM is to cause a power-cycle operation after a delay period has elapsed.

In a sixth implementation, alone or in combination with one or more of the first through fifth implementations, causing the power-down operation to commence enables the one or more processors to be powered-down in a sequence.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
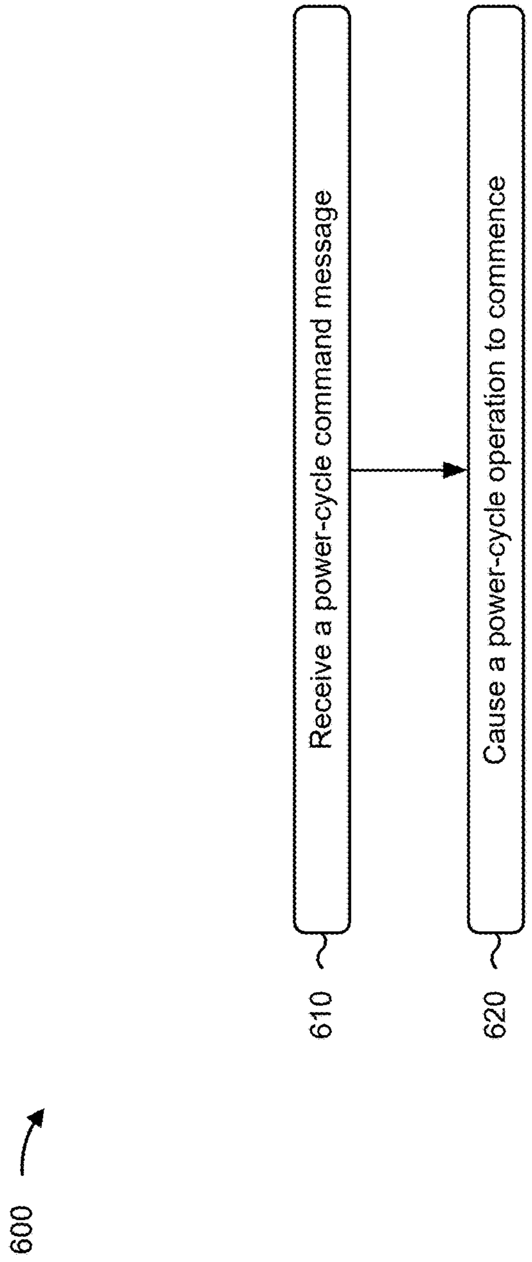
FIG. 6 is a flowchart of an example process associated with enabling a power-cycle operation of a PSM after a delay period has elapsed.

FIG. 6 is a flowchart of an example process 600 associated with enabling a power-cycle operation of a PSM after a delay period has elapsed. In some implementations, one or more process blocks of FIG. 6 are performed by a PSM of one or more PSMs of a network device (e.g., network device 210). In some implementations, one or more process blocks of FIG. 6 are performed by another device or a group of devices separate from or including the PSM, such as one or more processors of the network device. Additionally, or alternatively, one or more process blocks of FIG. 6 may be performed by one or more components of one or more components of device 300, such as processor 320, memory 330, input component 340, output component 350, and/or communication component 360; device 400, such as input component 410, switching component 420, output component 430, and/or controller 440; and/or another device.

As shown in FIG. 6, process 600 may include receiving a power-cycle command message (block 610). For example, the PSM may receive, from the one or more processors, a power-cycle command message, as described above.

As further shown in FIG. 6, process 600 may include causing a power-cycle operation to commence (block 620). For example, the PSM may cause, based on the power-cycle command message, a power-cycle operation to commence after a delay period has elapsed, as described above.

Process 600 may include additional implementations, such as any single implementation or any combination of implementations described below and/or in connection with one or more other processes described elsewhere herein.

In a first implementation, the power-cycle command message indicates that the power-cycle operation is to commence after the delay period has elapsed.

In a second implementation, alone or in combination with the first implementation, the delay period is greater than an amount of time to complete a power-down operation associated with the one or more processors.

In a third implementation, alone or in combination with one or more of the first and second implementations, process 600 may include sending, based on receiving the power-cycle command message, an acknowledgement message to the one or more processors.

In a fourth implementation, alone or in combination with one or more of the first through third implementations, sending the acknowledgement message enables a power-down operation associated with the one or more processors to commence.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a PSM" or "one or more PSMs") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network device, comprising:
one or more power supply modules (PSMs); and
one or more processors to:
send, to a PSM of the one or more PSMs, a power-cycle command message,
wherein the power-cycle command message includes a delay period for the PSM,
wherein the delay period is a period of time that the PSM waits to commence a power-cycle operation,
wherein the period of time is determined based on a power-down operation by at least one of the one or more processors being completed prior to the delay period elapsing; and
cause, based on sending the power-cycle command message, the power-down operation associated with the one or more processors to commence.

2. The network device of claim 1, wherein the one or more processors are further to:
determine, prior to sending the power-cycle command message, the delay period based on configuration information associated with the one or more processors.

3. The network device of claim 1, wherein the one or more processors are further to:
receive, after sending the power-cycle command message and before causing the power-down operation, an acknowledgement message from the PSM.

4. The network device of claim 3, wherein the acknowledgement message indicates at least one of:

the PSM received the power-cycle command message; or the PSM is to cause a power-cycle operation after the delay period has elapsed.

5. The network device of claim 1, wherein causing the power-down operation to commence enables the one or more processors to be powered-down in a sequence.

6. The network device of claim 1, wherein the power-cycle operation includes execution of a power-off operation of the PSM followed by execution of a power-on operation of the PSM.

7. The network device of claim 1, wherein the one or more processors are further to:

determine, prior to sending the power-cycle command message, the delay period based on identifying one or more characteristic parameters of the one or more processors.

8. A non-transitory computer-readable medium storing a set of instructions, the set of instructions comprising:

one or more instructions that, when executed by one or more processors of a network device, cause the network device to:

send, to a power supply module (PSM) of the network device, a power-cycle command message, wherein the power-cycle command message includes a delay period for the PSM, wherein the delay period is a period of time that the PSM waits to commence a power-cycle operation, wherein the period of time is determined based on a power-down operation by at least one of the one or more processors being completed prior to the delay period elapsing; and cause the power-down operation associated with the one or more processors to commence.

9. The non-transitory computer-readable medium of claim 8, wherein the delay period is greater than an amount of time to complete the power-down operation.

10. The non-transitory computer-readable medium of claim 8, wherein the one or more instructions, when executed by the one or more processors, further cause the network device to:

determine the delay period based on configuration information associated with the one or more processors; and generate the power-cycle command message to indicate that the PSM is to commence a power-cycle operation after the delay period has elapsed.

11. The non-transitory computer-readable medium of claim 8, wherein the one or more instructions, when executed by the one or more processors, further cause the network device to:

receive, after sending the power-cycle command message, an acknowledgement message from the PSM.

12. The non-transitory computer-readable medium of claim 11, wherein the acknowledgement message indicates at least one of:

the PSM received the power-cycle command message; or the PSM is to cause a power-cycle operation after a delay period has elapsed.

13. The non-transitory computer-readable medium of claim 8, wherein causing the power-down operation to commence enables the one or more processors to be powered-down in a sequence.

14. The non-transitory computer-readable medium of claim 8, wherein the power-cycle operation includes execution of a power-off operation of the PSM followed by execution of a power-on operation of the PSM.

15. The non-transitory computer-readable medium of claim 8, wherein the one or more instructions, when executed by the one or more processors, further cause the network device to:

determine, prior to sending the power-cycle command message, the delay period based on identifying one or more operation characteristics of the one or more processors.

16. A network device, comprising:

one or more processors; and one or more power supply modules (PSMs), wherein each PSM is to:

receive, from the one or more processors, a power-cycle command message;

send, based on receiving the power-cycle command message, an acknowledgement message to the one or more processors; and cause, based on the acknowledgement message, a power-cycle operation to commence after a delay period has elapsed, wherein the delay period ensures that the power-cycle operation commences after a power down operation is completed by the one or more processors.

17. The network device of claim 16, wherein the delay period is greater than an amount of time to complete a power-down operation associated with the one or more processors.

18. The network device of claim 16, wherein sending the acknowledgement message enables a power-down operation associated with the one or more processors to commence.

19. The network device of claim 16, wherein each PSM is further to:

send an acknowledgment message to the one or more processors via a bus between the one or more processors and the one or more PSMs.

20. The network device of claim 16, wherein the power down operation includes powering down at least one of the one or more processors.

* * * * *